Patented Feb. 22, 1949

2,462,345

UNITED STATES PATENT OFFICE 2,462,345

MONOMERIC FLUORINE COMPOUNDS CONTAINING A FOUR-CARBON ATOM RING

Paul L. Barrick, Wilmington, Del., assignor to E. I. du Pont de Nemours & Company, Wilmington, Del., a corporation of Delaware No Drawing. Application April 23, 1943, Serial No. 484,239

11 Claims. (Cl. 260—648)

This invention relates to new compositions of matter and more particularly to the preparation of fluorine-containing cyclobutanes.

This invention has as an object the manufacture of new organic fluorine compounds. A further object is the production of new monomeric organic fluorine compounds comprising fluorocyclobutane derivatives. Further objects reside in methods for preparing these compounds. Other objects will appear hereinafter.

The above objects are accomplished by heating, under the non-polymerizing conditions more particularly described hereinafter, a compound having a terminal carbon-to-carbon multiple bond with a polyfluoroethylene in which the only substituents are halogen atoms of which at least two are fluorine, i. e., a monomeric compound of the general formula $CX_2=CX_2$, in which at least two of the X's are fluorine and those remaining are hydrogen or halogen.

The fluoroethylene which is most valuable in the practice of this invention is tetrafluoroethylene which, as disclosed in U. S. Patent 2,230,654, polymerizes when subjected to super-atmospheric pressure at 20° to 25° C. for a few days. I have discovered that when tetrafluoroethylene, which has been stabilized against self-polymerization, is reacted with a terminally unsaturated organic compound new monomeric compounds are obtained rather than polymeric products or copolymers. By this means there is obtained a large number of monomeric organic fluorine compounds, the physical and chemical properties and analyses of which indicate they are polyfluoro compounds containing a ring structure consisting of four carbon atoms. The present invention makes possible the preparation of a wide variety of stab'e organic fluorine-containing cyclobutane derivatives which may contain a wide variety of functional groups. The previously disclosed organic fluorine compounds have usually been halogenated methane or ethane derivatives which are relatively inert in chemical reactions. Whereas po'yfluoroethylenes alone dimerize under the present conditions, it is surprising that the presence of another unsaturated organic compound results predominately in the formation of a polyfluorocyclobutane derivative containing as complementary portions of the molecule the polyfluoroethylene and the other unsaturated compound and little or none of the polyfluoroethylene dimer is obtained.

The preparation of the stabilized tetrafluoroethylene, which is not a part of this invention, can be accomplished by different means. One method consists in reducing the normally contained oxygen content (about 0.1% to 0.2% by volume) to not more than about 40 parts of oxygen in a million parts of tetrafluoroethylene. Another method for stabilizing tetrafluoroethylene against polymerization consists in adding polymerization inhibiting compounds. Compounds of this kind are those containing thiol sulfur, examples of which are n-butyl mercaptan, hydrogen sulfide, etc., and compounds containing amine nitrogen, for example, ammonia, di- and tri-butyl amine, and other amines. These methods are described more fully in United States Patents 2,407,396, 2,407,419 and 2,407,435.

The reaction between the terminally unsaturated organic compound and the polyfluoroethylene is best carried out under pressure in a closed system at a temperature of 50° to 300° C. and in the absence of a polymerization catalyst. The reaction can, however, be effected at somewhat higher temperatures, namely, up to 550° C. but below the decomposition temperature of the reactants and the products. The reaction can be carried out at subatmospheric, atmospheric, or superatmospheric pressure. The equipment used can be constructed of various metals such as iron, steel, aluminum, Monel metal, or copper.

In the case of tetrafluoroethylene and the preferred type of unsaturated organic compound which contains a terminal methylene group attached to carbon, thus,

the corresponding tetrafluoroethylene derivative is of the formula

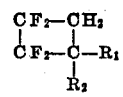

where $R_1$ and $R_2$ are hydrogen, halogen or other atoms or radicals originally attached to the carbon to which the methylene group was joined. A more general structural formula representing the polyfluorocyclobutanes obtainable by the present process is

in which two of the X's are fluorine and those remaining are hydrogen or halogen, and $R_1$ and $R_2$ have the significance just given and are, for example, H, alkyl, cycloalkyl, aryl, aralkyl, halogen,

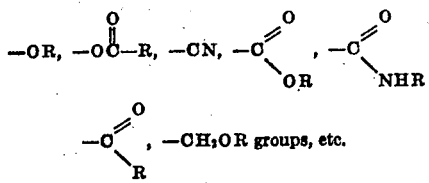

where R is alkyl, cycloalkyl, alkaryl, aralkyl and hydrogen. These polyfluorocyclobutanes are of particuar value because the presence of the hydrogen atoms provides a point of attack by which new functional groups can be introduced into the molecule.

The following examples are further illustrative of the practice of this invention.

Example I

A silver lined autoclave was flushed with nitrogen and evacuated. The autoclave was cooled and 125 parts of propylene and 50 parts of tetrafluoroethylene, stabilized by removing oxygen content to below 40 parts per million, where added. The autoclave was closed and heated at 225° C. for 9 hours. An attached pressure gauge indicated a pressure drop of about 1000 lbs./sq. in. during the reaction. The autoclave was cooled to about 0° C. and bled slowly. The 24 parts of clear liquid product recovered from the autoclave was steam distilled to yield 16.5 parts of steam-volatile, water-insoluble 1-methyl-2,2,3,3-tetrafluorocyclobutane which boiled at 68.5°-68.8° C. Analysis: Calcd. for $C_5H_6F_4$: F, 53.53. Found: F, 53.73. A yield of 3.6 parts of a non-steam volatile sticky gummy copolymer containing fluorine, carbon and hydrogen was also obtained.

Example II

One hundred and fifty parts of dimethallyl ether was charged into a silver lined autoclave. After evacuating and adding 50 parts of stabilized tetrafluoroethylene, the autoclave was closed and heated 8.25 hours at 110° C. The reaction mixture was steam distilled and the steam volatile dimethallyl ether layer was separated and fractionated through an efficient packed column. After removing the unreacted dimethallyl ether, a definite fraction was obtained boiling at 70°-72° C./19 mm. which analysis indicated to be 1-methyl-1-methallyloxymethyl - 2,2,3,3 - tetrafluorocyclobutane. Analysis: Calcd. for $C_{10}H_{14}F_4O$: F, 33.6; C, 53.2; H, 618; iodine No. 112.3. Found: F, 32.72; C, 54.47; H, 6.71; iodine No. 120.2. A yield of 4.4 parts of a soft sticky non-steam volatile polymeric product was also obtained.

Example III

A silver lined reaction vessel was evacuated and charged with 54 parts of butadiene and 100 parts of stabilized tetrafluoroethylene and then closed and heated at 100° C. for 12 hours. The reactor was cooled, bled of excess gas, opened and the product discharged. There was obtained 123 parts of colorless organic liquid which on distillation yielded 102 parts of 1-vinyl-2,2,3,3-tetrafluorocyclobutane boiling at 83°-85° C. The product was unsaturated as evidenced by reaction with dilute aqueous potassium permanganate. Hydrogenation using Raney nickel catalyst gave 1-ethyl-2,2,3,3-tetrafluorocyclobutane and oxidation with 50% nitric acid yielded an acid whose analysis and physical constants checked for tetrafluorocyclobutane monocarboxylic acid which substantiates that the above product is vinyl tetrafluorocyclobutane.

Example IV

A stainless steel reactor was flushed with nitrogen, evacuated, and charged with 50 parts of monovinyl acetylene and 50 parts of tetrafluoroethylene (containing less than 20 P. P. M. of oxygen). The autoclave was heated at 100° C. with agitation for 16.5 hours and then cooled to room temperature and opened. Eighty-two parts of a light yellow colored liquid reaction mixture was obtained which was steam distilled to yield about 60 parts of steam-volatile, colorless liquid products heavier than water and about 20 parts of light yellow colored non-steam volatile copolymer containing about 26% fluorine. Fractional distillation of the steam-volatile products through a precision still yielded at least four definite products coresponding to the following, of which fractions I and II predominated:

| Fraction | Boiling Point | Found | | | Mole Ratio $C_2F_4/C_4H_4$ | Structure |
|---|---|---|---|---|---|---|
| | | F | C | H | | |
| I | 82°-84° C. | 50.51 | 51.65 | 3.63 | 1:1 | $\begin{array}{l}CF_2-CH_2\\|\quad\quad|\\CF_2-CH-C\equiv CH\end{array}$ |
| II | 96°-99° C. | 51.13 | 46.66 | 2.81 | 1:1 | $\begin{array}{l}CF_2-CH\\|\quad\quad\|\\CF_2-C-CH=CH_2\end{array}$ |
| III | 49°-50° C./13 mm | 59.02 | 39.52 | 3.31 | 2:1 | $\begin{array}{l}CF_2-CH_2\quad CH-CF_2\\|\quad\quad|\quad\quad\|\quad\quad|\\CF_2-CH\quad\quad C\quad\quad CF_2\end{array}$ |
| IV | 60°-65° C./5 mm | 40.35 | 58.71 | 4.41 | 1:2 | (benzene ring with $CH-CH_2$ / $CF_2-CF_2$) |

| | F | C | H | Mole Ratio $C_2F_4/C_4H_4$ |
|---|---|---|---|---|
| Analysis calculated for— | | | | |
| $C_6F_4H_6$ | 50.0 | 47.37 | 2.63 | 1:1 |
| $C_7F_7H_4$ | 60.3 | 38.1 | 1.58 | 2:1 |
| $C_{10}F_4H_8$ | 37.25 | 58.8 | 3.92 | 1:2 |

The structures of the products as shown above are based on the analyses, physical constants and various chemical reactions of the products. The presence of the acetylenic group in fraction I is readily shown by its reaction with aqueous silver nitrate solution and is also shown by its infrared absorption spectrum. Fraction II is concluded to be vinyltetrafluorocyclobutene since only 1-ethyl-2,2,3,3-tetrafluorocyclobutane boiling at 90°-91° C. was obtained on hydrogenation of fractions I and II. $n_D^{25}$ 1.3370; $d_4^{25}$ 1.1506.

The product boiling at 60°-65° C./5 mm. was shown to be identical with the product of Example XV, 1-phenyl-2,2,3,3-tetrafluorocyclobutane which was obtained by reacting tetrafluoroethylene and styrene, the styrene in the present instance being formed in situ by dimerization of the monovinylacetylene.

Example V

A stainless steel autoclave was flushed with ntrogen, charged with 125 parts of freshly distilled acrylonitrile and then cooled and evacuated. After adding 50 parts of stabilized tetrafluoroethylene which contained as the polymerization inhibiting agent approximately .1 part of "Terpene B" hydrocarbon (a terpene fraction consisting principally of dipentene and terpenolene boiling at 176°-196° C.), the autoclave was closed and heated at 150° C. for 8.25 hours. The reaction mixture was steam distilled and the steam volatile water-insoluble organic liquid separated and distilled through a packed column. There was obtained 60 parts of 1-cyano-2,2,3,3-tetrafluorocyclobutane boiling at 148° C. Analysis: Calcd. for $C_5H_3F_4N$: F, 49.7; N, 9.15; C, 39.2; H, 1.96. Found: F, 49.19; N, 9.24; C, 37.0; H, 2.07.

Example VI

One hundred and twenty-five parts of isobutylene and 50 parts of stabilized tetrafluoroethylene was heated in a stainless steel autoclave for 8.25 hours at 225° C. similar to procedure described in Example I. There was obtained 24 parts of 1,1-dimethyl-2,2,3,3-tetrafluorocyclobutane boiling at 82°-83° C. Analysis: Calcd. for $C_6H_8F_4$: F, 48.72. Found: F, 49.24.

Example VII

One hundred and twenty-five parts of vinyl chloride and 50 parts of tetrafluoroethylene containing a small amount of the stabilizing agent mentioned in Example V was reacted together in a stainless steel autoclave for 8 hours at 150° C. There was obtained 19 parts of 1-chloro-2,2,3,3-tetrafluorocyclobutane boiling at 73°-74° C. Analysis: Calcd. for $C_4H_3F_4Cl$: F, 46.8; Cl, 21.85; C, 29.53; H, 1.84. Found: F, 47.69; Cl, 21.78; C, 30.43; H, 1.86.

Example VIII

A stainless steel autoclave was flushed with nitrogen and .1 part of hydroquinone added. The autoclave was evacuated and charged with 125 parts of propylene and 50 parts of freshly distilled tetrafluoroethylene containing less than 20 parts per million of oxygen. After heating 9 hours at 150° C. the autoclave was cooled in ice and bled slowly. Forty and three-tenths parts of liquid methyltetrafluorocyclobutane as described in Example I was obtained from the autoclave. On repeating the experiment without the hydroquinone and distilling the tetrafluoroethylene from a cylinder containing .5% of the previously mentioned terpene stabilizing agent directly into the autoclave, 46.7 parts of methyltetrafluorocyclobutane as described in Example I was obtained. On repeating the experiment using 125 parts of propylene, 50 parts of freshly distilled tetrafluoroethylene and 25 parts of deoxygenated distilled water, 32.5 parts of methyltetrafluorocyclobutane as described in Example I was obtained.

The following table summarizes the results of a number of additional examples.

| Example | Polyfluoroethylene | Unsaturated Compounds | Temp., °C. | Time, Hrs. | Boiling Point of Cyclobutane Derivative, °C. |
|---|---|---|---|---|---|
| IX | Tetrafluoroethylene | Methallyl chloride | 150 | 6.25 | 122–124. |
| X | do | Ethylene | 200 | 7.5 | 50–50.7. |
| XI | do | Vinyl tetrafluorocyclobutane. | 150 | 8.5 | 57.5–59.5 (M. P.). |
| XII | do | Chloroprene | 100 | 9.75 | 108. 122–124. |
| XIII | do | Isoprene | 125 | 11.25 | 100.5. |
| XIV | do | Piperylene | 100 | 9 | 110–113. |
| XV | do | Styrene | 175 | 13 | 61/5 mm. |
| XVI | do | Vinyl acetate | 150 | 13 | 138–139.5. |
| XVII | do | Vinylidene chloride | 150 | 12 | 84–5. |
| XVIII | do | Allyl cyanide | 150 | 8 | 193–195. |
| XIX | do | Allyl chloride | 150 | 9.5 | 115–116. |
| XX | do | Allyl alcohol | 150 | 8 | 154–157. |
| XXI | do | Acrolein | 150 | 8 | 117–117.5. |
| XXII | do | Butene-2 | 175 | 7.75 | 87–87.5. |
| XXIII | do | Methyl methacrylate | 150 | 12 | 70/56 mm. |
| XXIV | do | Isopropyl ethynyl carbinol | 150 | 7.5 | 87–95/28 mm. |
| XXV | do | Methacrolein | 150 | 8 | 120–122. |
| XXVI | do | Furylethylene | 150 | 8 | 86–87/80 mm. |
| XXVII | do | Methyl vinyl ether | 150 | 9.5 | 89–92. |
| XXVIII | do | Methyl vinyl ketone | 150 | 8.25 | 134–135.5. |
| XXIX | Trifluorochloroethylene | Butadiene | 100 | 8 | 115. |

Example XXX

A silver tube (0.6" I. D. x 54" long) was inserted in a steel tube mounted vertically and heated over a 3' section by means of an electric furnace. The temperature of the tube was measured by means of a thermocouple placed at the center of the furnace between the steel tube and the furnace wall. A mixture consisting of 84 parts of vinyl chloride and 140 parts of stabilized tetrafluoroethylene was passed through the reaction tube at 498°–526° C. over a period of 6 hours. The product which was collected in a receiver cooled in a Dry Ice-acetone mixture was fractionally distilled in a low temperature still to yield 24 parts of product boiling above room temperature. The principal fraction boiling at 73°–77° C. was 1 - chloro - 2,2,3,3 - tetrafluorocyclobutane as described in Example VII.

In addition to the tetrafluoroethylene and trifluorochloroethylene mentioned in the examples, this invention is applicable to other monomeric polyfluoroethylenes, among them trifluoroethylene, 1,1-difluoro-2,2-dichloroethylene, 1,2-difluoro - 1,2 - dichloroethylene, 1,1 - difluoroethylene (vinylidene fluoride), 1,1-difluoro-2-chloroethylene, and trifluorobromoethylene. The tetrahalogenoethylenes having three or more fluorine atoms are most reactive with the other compound having terminal unsaturation.

The compounds which react with the polyfluoroethylenes in accordance with this invention to produce the new compounds described herein are terminally unsaturated organic compounds containing ethylenic and/or acetylenic unsaturation. Thus, when an unsaturated compound containing an acetylenic linkage, such as is present in methylacetylene, is reacted with a polyfluoroethylene in accordance with the process of this invention a polyfluorocyclobutene is obtained, whereas a polyfluorocyclobutane is obtained when a terminally unsaturated compound containing ethylenic unsaturation, e. g., propylene, is used. The preferred unsaturated organic compounds, as previously indicated, contain a terminal methylene group attached to carbon, thus,

and includes vinyl and vinylidene compounds such as vinyl halides such as vinyl fluoride, vinyl chloride, vinyl bromide and vinyl iodide; vinyl esters such as vinyl formate, vinyl propionate, vinyl butyrate and vinyl benzoate; acrylic and methacrylic acids, anhydrides, amides, esters and other derivatives, methyl chloroacrylate, acrylonitrile and methacrylonitrile; methylene malonic acid and esters, unsaturated hydrocarbons such as ethylene, propylene, butene-1, pentene-1, hexene-1, monovinylacetylene, divinylacetylene, substituted styrene derivatives such as chloro and nitro styrenes; dienes, 2-fluorobutadiene-1,3, 2,3-dimethyl butadiene, unsaturated ethers such as divinyl ether, allyl ethers, methylallyl ether, unsaturated aldehydes and ketones, 2-chloropropene, 3,4-dichlorobutene-1, N-vinyl imides such as N-vinylsuccimide, N-vinylphthalimide, allyl esters, vinyl cyclohexene, vinyl naphthalene, dimethyl-(vinylethynyl)carbinol, etc. Other terminally unsaturated compounds which can be used in the present process are furylacrylic acid and esters, diisobutylene, trichloroethylene, 1,2-dichloroethylene, the polyfluoroethylenes disclosed above when different from the primary polyfluoroethylene reactant, acetylene, methylacetylene, etc.

The previously mentioned requirement for obtaining the monomeric cyclobutanes, namely, that the tetrafluoroethylene be stabilized against polymerization by removal of the normally contained oxygen or by addition of a polymerization inhibitor is essentially a requirement that the reaction be conducted in the absence of a catalyst. However, this does not preclude the presence of materials which sometimes function as polymerization catalysts since the effect of the polymerization accelerator is neutralized by the inhibitor. Even though the reaction mixture is free from polymerization catalyst it is often advantageous to include a polymerization inhibitor also, although some polyfluoroethylenes and unsaturated organic compounds exercise a mutual polymerization inhibiting effect on each other which in some instances is sufficiently strong as not to preclude the presence of material normally functioning as a polymerization catalyst. When an inhibitor is used the amount may, therefore, vary within relatively large limits depending on the nature of the reactants, and desirable results are obtained generally with amounts from .0001 to 3% by weight of the material treated. It is sometimes desirable to use a mixture of inhibitors since the effectiveness of the various inhibitors may not be the same for the polyfluoroethylene and for the unsaturated organic compound.

The proportions of the reactants can also vary considerably depending largely upon the nature of the reactants, the method of operation and the results desired. Stoichiometrically, one equivalent of polyfluoroethylene corresponds to one equivalent of a monoethylenic unsaturated organic compound. In general, an excess of the unsaturated organic compound favors the formation of the products of this invention and practically eliminates the formation of the polyfluoroethylene dimer.

The process can be operated continuously or intermittently. The reaction and the separation or isolation of the products can be carried out simultaneously or in separate steps. The reaction can be carried out in a closed system or the reaction can be carried out in the vapor phase by mixing the vapors of the reactants, and if desired, passing the mixture through a hot reaction tube. In general, the reaction is carried out under subatmospheric, atmospheric or superatmospheric phessure in the range of .1 to 1000 atmospheres, the best results being obtained at a pressure range of 1 to 200 atmospheres.

The temperature used depends somewhat upon the results desired, and will vary from about 50° C. to 300° C. The time required will vary from a few seconds in a vapor phase reaction to several days depending upon the nature of the reactants and the other operating conditions such as temperature and pressure.

In general, it is preferred to carry out the reactions by mixing the monomeric unsaturated compounds and heating to the desired reaction temperature. However, it is sometimes advantageous to add an inert solvent or diluent such as water to the reaction mixture to facilitate dissipating the heat in case the reaction is exothermic.

The invention is particularly advantageous in that it offers a safe, flexible, practical and economical method for producing relatively highly fluorinated organic compounds of the character herein described. One of the principal advantages of the present reaction is that it is a convenient and new method for preparing fluorine-containing organic compounds which contain a wide variety of different functional groups. The products of this invention are useful for various commercial purposes. Thus since many of the products of the invention are extremely stable and not subject to ring opening on chlorination, nitration, oxidation, etc., they are generally applicable for use as solvents and reaction media. Many of the products investigated have been found to be very desirable in that they are substantially non-flammable, non-corrosive and non-toxic. Many of the products may be used as intermediates for preparing other useful chemicals.

As many apparently widely different embodiments of this invention may be made without departing from the spirit and scope thereof, it is to be understood that I do not limit myself to the specific embodiments thereof except as defined in the appended claims.

I claim:

1. A process for preparing monomeric organic fluorine compounds containing a four-carbon ring, said process comprising heating, in contact with a polymerization inhibitor at a temperature of from about 50° C. to 300° C., an unsaturated compound having a terminal carbon-to-carbon multiple bond and another unsaturated compound which is a monoethylenic compound of two and only two carbon atoms having attached thereto substituents consisting of from two to four halogen atoms of which at least two are fluorine.

2. The process set forth in claim 1 in which said first mentioned unsaturated compound contains a terminal methylene group.

3. The process set forth in claim 1 in which said last mentioned compound is a tetrahalogenoethylene.

4. The process set forth in claim 1 in which said monoethylenic compound is tetrafluoroethylene.

5. A process for preparing 1,1-dimethyl-2,2,3,3-tetrafluorocyclobutane comprising heating, at a temperature of from about 50° C to 300° C., isobutylene with tetrafluoroethylene which contains a polymeriztion inhibitor and which is stable against polymerization on standing at normal temperature.

6. A monomeric compound having a ring of four atoms consisting of carbon atoms, said atoms comprising a pair of adjacent saturated carbon atoms having as the sole substituents thereon from 2 to 4 halogen atoms of which at least two are fluorine atoms, the carbon atom in one of the two remaining positions in said ring being unsubstituted.

7. The monomeric compound defined in claim 6 in which four halogen atoms of which at least two are fluorine atoms are attached to said pair of carbon atoms.

8. The monomeric compound defined in claim 6 in which said fluorine atoms are four in number.

9. A polyfluorocyclobutane consisting of the monomeric compound defined in claim 6.

10. 1,1-dimethyl-2,2,3,3-tetrafluorocyclobutane.

11. 1-chloro-2,2,3,3-tetrafluorocyclobutane.

PAUL L. BARRICK.

REFERENCES CITED

The following references are of record in the file of this patent:

UNITED STATES PATENTS

| Number | Name | Date |
| --- | --- | --- |
| 1,967,244 | Holt et al. | July 24, 1934 |
| 2,217,632 | Wolfe | Oct. 8, 1940 |

FOREIGN PATENTS

| Number | Country | Date |
| --- | --- | --- |
| 796,026 | France | Mar. 27, 1936 |

OTHER REFERENCES

Ellis: "Chemistry of Petroleum Derivatives," vol. I, pages 746–7.

"Chemical Abstracts," vol. 30, cols. 4153–4 (1936), abstract of article by Swarts in "Bull. Sci. Acad. Roy. Belg.," vol. 22, pages 105–21 (1936).

Egloff: "Reactions of Pure Hydrocarbons," pages 586–9.